Patented Nov. 10, 1936

2,060,412

UNITED STATES PATENT OFFICE 2,060,412

OIL VARNISH

Wilhelm Breuers and Hermann Schatz, Ludwigshafen-on-the-Rhine, Germany, assignors to I. G. Farbenindustrie Aktiengesellschaft, Frankfort-on-the-Main, Germany No Drawing. Application February 9, 1934, Serial No. 710,526. In Germany February 16, 1933

18 Claims. (Cl. 134—17)

The present invention relates to oil varnishes and a process of producing same.

We have found that oil varnishes of excellent properties can be obtained by incorporating with drying oils thermoplastic, resinous, brittle conversion products of rubber, being less unsaturated than rubber, having a softening point between 50° and 130° C., preferably between 70° and 100° C. and being readily soluble in aromatic, aliphatic open chain or cycloaliphatic hydrocarbons and in chlorinated hydrocarbons.

The rubber isomerization products to be employed according to this invention may be obtained, for example, by causing isomerization agents to act on rubber or rubber solutions at ordinary or elevated temperature and at atmospheric or increased pressure, so that substances of a pronounced resinous character are formed. Suitable isomerization agents are, for example, surface-active substances, such as the bleaching earth known in the trade as "Tonsil AC", which agents are advantageously allowed to act on rubber, preferably in the presence of organic solvents, at elevated temperatures, such as, for example, between 200° and 300° C. The production of rubber isomerization products by the use of such surface-active substances is disclosed in the co-pending application, Serial No. 629,081, filed August 16, 1932, by one of us. Further isomerization agents which may also be employed are phosphorus oxychloride, sulfuric acid and organic sulphonic acids. The isomerization products have, like rubber, the composition $(C_5H_8)_x$ but are less unsaturated. Varnishes prepared while employing rubber isomerization products which have been obtained in the presence of surface-active substances frequently have especially favorable properties.

The products obtainable from the said resinous substances by catalytic hydrogenation, which may also be employed for the said purpose, are generally of lighter color than the non-hydrogenated substances. As initial materials for the preparation of isomerization products of the said kind, balata, gutta percha and like rubber-like substances may be employed instead of rubber. The said hydrogenation products have, of course, a somewhat higher content of hydrogen, for example, they contain from 8 to 8.8 atomic proportions of hydrogen per 5 atomic proportions of carbon.

The conversion products of rubber to be used are characterized by the following properties. If solutions thereof in organic solvents are allowed to evaporate on a substratum, brittle coatings are obtained, which are neither extensible nor proof against creasing. The softening points (determined according to the method of Krämer-Sarnow) of the rubber isomerization products usually lie between about 50° and about 130° C. in most cases between 70° and 100° C. The viscosity of their solutions, as for example in oils, is comparatively very small; 50 per cent solutions may therefore be worked up. The color of the rubber isomerization products is generally speaking yellowish to clear red-brown. The substances dissolve readily in aromatic, aliphatic open chain or cycloaliphatic hydrocarbons, chlorinated hydrocarbons, as for example benzine, toluene, solvent naphtha, tetrahydronaphthalene, decahydronaphthalene, benzine and petroleum fractions, such as those distilling between 130° and 200° C., methylene chloride, carbon tetrahcloride and chlorbenzene. They are not soluble, however, in low alcohols and ketones.

The preparation of the new, valuable oil varnishes may be carried out in the usual manner by boiling with drying oils and subsequent addition of siccatives, such as cobalt, lead or manganese naphthanates. The boiling is carried out at temperatures usually not above 350° C., preferably at between about 240° and 260° C. For this purpose all drying oils and boiled drying oils are suitable, such as linseed oil, linseed oil-stand oil, Chinawood oil and poppy-seed oil in any usual form. The ratio of oil to resin component in the varnishes may be varied within wide limits, as for example between 0.5:1 (preferably 2:1) and 20:1 (preferably 10:1). After boiling, suitable solvents, such as mineral oil fractions, hydrocarbons of the benzine series, chlorinated hydrocarbons or any other solvent usually employed in the oil varnish industry, are added. The amount of the solvent varies within the widest limits according to the purposes for which the varnish is to be used. For example varnishes containing 40 per cent of solvent may be prepared, but, of course, this percentage is only given by way of example and any other proportion of the components usual in the oil varnish industry may be employed. Varnishes may also be prepared by simply mixing a solution in benzine or other suitable solvents of the isomerization products or of their hydrogenation products with stand oils and a siccative, and, if desired, pigments.

Other resins, either synthetic or natural, may be employed together with the rubber isomerization products. Pigments, softening agents and other additions such as metal powders, may also be incorporated with the varnishes.

The application of the oil varnishes onto the substrata may be effected in any suitable manner. Varnishes prepared in this way are distinguished, for example, by excellent adhesive power, high gloss and good rate of flow. An especially valuable property of the varnishes consists in the fact that they dry very rapidly. Even very fatty varnishes, as for example those containing 10 parts of oil to each part of resin, dry considerably more rapidly when employing rubber isomerization products than correspondingly composed oil varnishes without these substances. The varnishes having the said additions also have excellent fastness to the influence of the atmosphere and the original high gloss remains unimpaired on exposure to light and rain. Furthermore, the corrosion-preventing action of the coatings prepared with the varnishes is excellent. For example sheet metal provided with clear coatings of varnishes of the said kind show no trace of rusting under the surface even after weathering for long periods in a strongly corrosive atmosphere.

The following examples will further illustrate the nature of this invention but the invention is not restricted to these examples. The parts are by weight.

Example 1

1 part of a resinous rubber isomerization product (obtained by heating crepe rubber in a rotary autoclave together with a bleaching earth known under the trade name "Tonsil AC" for five hours to 200° C., further five hours to 225° C. and finally for ten hours to from 250° C. to 260° C. and subsequently purifying the resultant product) is boiled for about an hour with 3 parts of a mixture of 9 parts of linseed oil-stand oil and 1 part of crude China-wood oil. The warm mixture is then incorporated with 0.5 per cent of a lead-cobalt naphthenate mixture (calculated with reference to the amount of oil). A clear varnish is obtained which, after dilution with 2.7 parts of a benzine fraction boiling between 130° and 160° C., yields on sheet iron and wood coatings of excellent dispersion and very high gloss. The coatings are dust-dry after about 3 hours and are thoroughly dried throughout after about 30 hours. Manganese naphthenate may be used with a similar effect. Coatings produced with the said oil varnish are hard and possess a good gloss and coloration even after exposure to weathering for long times.

Example 2

1 part of the resinous rubber isomerization product according to Example 1 is boiled for from about 1½ to 2 hours with 9 parts of the oil mixture mentioned therein and 0.5 per cent of a lead-cobalt naphthenate (calculated with reference to the amount of oil) is added to the still warm mixture. A varnish is obtained which is dried out when about 3 hours. It may be diluted with benzine.

If the coatings obtained with the said oil-varnish are exposed for long periods to weathering, they still have a satisfactory gloss and do not become yellow. The hardness of the coatings is good. Very valuable oil varnishes are obtained by adding pigments to varnishes produced in the manner described in the present and the preceding example. For example by the addition of carbon black, pigment deep black R (Schulz Julius, Farbstofftabellen, 7th ed., vol. II, page 175) black varnishes and by the addition of zinc white, lithopone or titan white, white varnishes are obtained which have remarkable stability. Any other pigment, for example metal bronzes, may also be combined with the said oil varnishes. The said pigments are used in amounts usual in the oil-varnish industry.

What we claim is:—

1. The process of producing oil-varnishes which comprises incorporating from 0.5 to 20 parts by weight of a drying oil with each part by weight of a thermoplastic, resinous, brittle conversion product of rubber being less unsaturated than rubber, having a softening point of between 50° and 130° C., being readily soluble in aromatic, open chain aliphatic and cycloaliphatic hydrocarbons and chlorinated hydrocarbons, and being selected from the group consisting of the isomerization products obtained by reacting rubber with an isomerization agent of the class consisting of surface-active substances, phosphorus oxychloride, sulfuric acid and organic sulfonic acids and the products obtainable from such isomerization products by catalytic hydrogenation.

2. The process of producing oil-varnishes which comprises incorporating from 0.5 to 20 parts by weight of a drying oil with each part by weight of a thermoplastic, resinous, brittle conversion product of rubber being less unsaturated than rubber, having a softening point of between 70° and 100° C., being readily soluble in aromatic, open chain aliphatic and cycloaliphatic hydrocarbons and chlorinated hydrocarbons, and being selected from the group consisting of the isomerization products obtained by reacting rubber with an isomerization agent of the class consisting of surface-active substances, phosphorus oxychloride, sulfuric acid and organic sulfonic acids and the products obtainable from such isomerization products by catalytic hydrogenation.

3. The process of producing oil-varnishes which comprises incorporating from 2 to 10 parts by weight of a drying oil with each part by weight of a thermoplastic, resinous, brittle conversion product of rubber being less unsaturated than rubber, having a softening point of between 70° and 100° C., being readily soluble in aromatic, open chain aliphatic and cycloaliphatic hydrocarbons and chlorinated hydrocarbons, and being selected from the group consisting of the isomerization products obtained by reacting rubber with an isomerization agent of the class consisting of surface-active substances, phosphorus oxychloride, sulfuric acid and organic sulfonic acids and the products obtainable from such isomerization products by catalytic hydrogenation.

4. The process of producing oil-varnishes which comprises incorporating from 0.5 to 20 parts by weight of a drying oil with each part by weight of a thermoplastic, resinous, brittle conversion product of rubber being less unsaturated than rubber, having a softening point of between 50° and 130° C., being readily soluble in aromatic, open chain aliphatic and cycloaliphatic hydrocarbons and chlorinated hydrocarbons, and being selected from the group consisting of the isomerization products obtained by reacting rubber with an isomerization agent of the class consisting of surface-active substances, phosphorus oxychloride, sulfuric acid and organic sulfonic acids and the products obtainable from such isomerization products by catalytic hydrogenation, and heating the mixture to temperatures ranging up to 350° C.

5. The process of producing oil-varnishes which comprises incorporating from 0.5 to 20 parts by weight of a drying oil with each part by weight of a thermoplastic, resinous, brittle conversion product of rubber being less unsaturated than rubber, having a softening point of between 50° and 130° C., being readily soluble in aromatic, open chain aliphatic and cycloaliphatic hydrocarbons and chlorinated hydrocarbons, and being selected from the group consisting of the isomerization products obtained by reacting rubber with an isomerization agent of the class consisting of surface-active substances, phosphorus oxychloride, sulfuric acid and organic sulfonic acids and the products obtainable from such isomerization products by catalytic hydrogenation, and heating the mixture to temperatures between about 240° and 260° C.

6. The process of producing oil-varnishes which comprises incorporating from 2 to 10 parts by weight of a drying oil with each part by weight of a thermoplastic, resinous, brittle conversion product of rubber being less unsaturated than rubber, having a softening point of between 70° and 100° C., being readily soluble in aromatic, open chain aliphatic and cycloaliphatic hydrocarbons and chlorinated hydrocarbons, and being selected from the group consisting of the isomerization products obtained by reacting rubber with an isomerization agent of the class consisting of surface-active substances, phosphorus oxychloride, sulfuric acid and organic sulfonic acids and the products obtainable from such isomerization products by catalytic hydrogenation, and heating the mixture to temperatures ranging up to 350° C.

7. The process of producing oil-varnishes which comprises incorporating from 2 to 10 parts by weight of a drying oil with each part by weight of a thermoplastic, resinous, brittle conversion product of rubber being less unsaturated than rubber, having a softening point of between 70° and 100° C., being readily soluble in aromatic, open chain aliphatic and cycloaliphatic hydrocarbons and chlorinated hydrocarbons, and being selected from the group consisting of the isomerization products obtained by reacting rubber with an isomerization agent of the class consisting of surface-active substances, phosphorus oxychloride, sulfuric acid and organic sulfonic acids and the products obtainable from such isomerization products by catalytic hydrogenation, and heating the mixture to temperatures between about 240° and 260° C.

8. The process of producing oil-varnishes which comprises incorporating from 0.5 to 20 parts by weight of drying oil with each part by weight of a thermoplastic, resinous, brittle conversion product of rubber being less unsaturated than rubber, having a softening point of between 70° and 100° C., being readily soluble in aromatic, open chain aliphatic and cycloaliphatic hydrocarbons and chlorinated hydrocarbons, and being selected from the group consisting of the isomerization products obtained by reacting rubber with an isomerization agent of the class consisting of surface-active substances, phosphorus oxychloride, sulfuric acid and organic sulfonic acids and the products obtainable from such isomerization products by catalytic hydrogenation, and heating the mixture to temperatures between about 240° and 260° C. and adding an organic solvent.

9. The process of producing oil-varnishes which comprises incorporating from 2 to 10 parts by weight of a drying oil with each part by weight of a thermoplastic, resinous, brittle conversion product of rubber being less unsaturated than rubber, having a softening point of between 70° and 100° C., being readily soluble in aromatic, open chain aliphatic and cycloaliphatic hydrocarbons and chlorinated hydrocarbons, and being selected from the group consisting of the isomerization products obtained by reacting rubber with an isomerization agent of the class consisting of surface-active substances, phosphorus oxychloride, sulfuric acid and organic sulfonic acids and the products obtainable from such isomerization products by catalytic hydrogenation, and heating the mixture to temperatures between about 240° and 260° C. and adding benzine.

10. The process of producing oil-varnishes which comprises incorporating from 2 to 10 parts by weight of a drying oil with each part by weight of a thermoplastic, resinous, brittle conversion product of rubber being less unsaturated than rubber, having a softening point of between 70° and 100° C., being readily soluble in aromatic, open chain aliphatic and cycloaliphatic hydrocarbons and chlorinated hydrocarbons, and being selected from the group consisting of the isomerization products obtained by reacting rubber with an isomerization agent of the class consisting of surface-active substances, phosphorus oxychloride, sulfuric acid and organic sulfonic acids and the products obtainable from such isomerization products by catalytic hydrogenation and heating the mixture to temperatures between 240° and 260° C., adding an organic solvent and incorporating with the mass obtained a siccative.

11. The process of producing oil-varnishes which comprises incorporating from 0.5 to 20 parts by weight of a drying oil with a solution in an organic solvent of one part by weight of a thermoplastic, resinous, brittle conversion product of rubber being less unsaturated than rubber, having a softening point of between 50° and 130° C., being readily soluble in aromatic, open chain aliphatic and cycloaliphatic hydrocarbons and chlorinated hydrocarbons, and being selected from the group consisting of the isomerization products obtained by reacting rubber with an isomerization agent of the class consisting of surface-active substances, phosphorus oxychloride, sulfuric acid and organic sulfonic acids and the products obtainable from such isomerization products by catalytic hydrogenation.

12. The process of producing oil-varnishes which comprises incorporating from 2 to 10 parts by weight of a drying oil with each part by weight of a thermoplastic, resinous, brittle conversion product of rubber being less unsaturated than rubber, having a softening point of between 70° and 100° C., being readily soluble in aromatic, open chain aliphatic and cycloaliphatic hydrocarbons and chlorinated hydrocarbons, and being selected from the group consisting of the isomerization products obtained by reacting rubber with an isomerization agent of the class consisting of surface-active substances, phosphorus oxychloride, sulfuric acid and organic sulfonic acids and the products obtainable from such isomerization products by catalytic hydrogenation, and heating the mixture to temperatures between about 240° and 260° C., adding an organic solvent and incorporating with the mass obtained a siccative and a pigment.

13. Oil-varnishes comprising from 0.5 to 20 parts by weight of a drying oil and one part by weight of a thermoplastic, resinous, brittle conversion product of rubber being less unsaturated than rubber, having a softening point of between 50° and 130° C., being readily soluble in aromatic, open chain aliphatic and cycloaliphatic hydrocarbons and chlorinated hydrocarbons, and being selected from the group consisting of the isomerization products obtained by reacting rubber with an isomerization agent of the class consisting of surface-active substances, phosphorus oxychloride, sulfuric acid and organic sulfonic acids and the products obtainable from such isomerization products by catalytic hydrogenation.

14. Oil-varnishes comprising from 2 to 10 parts by weight of a drying oil and one part by weight of a thermoplastic, resinous, brittle conversion product of rubber being less unsaturated than rubber, having a softening point of between 70° and 100° C., being readily soluble in aromatic, open chain aliphatic and cycloaliphatic hydrocarbons and chlorinated hydrocarbons, and being selected from the group consisting of the isomerization products obtained by reacting rubber with an isomerization agent of the class consisting of surface-active substances, phosphorus oxychloride, sulfuric acid and organic sulfonic acids and the products obtainable from such isomerization products by catalytic hydrogenation.

15. Oil-varnishes comprising from 0.5 to 20 parts by weight of a drying oil, one part by weight of a thermoplastic, resinous, brittle conversion product of rubber being less unsaturated than rubber, having a softening point of between 70° and 100° C., being readily soluble in aromatic, open chain aliphatic and cycloaliphatic hydrocarbons and chlorinated hydrocarbons, and being selected from the group consisting of the isomerization products obtained by reacting rubber with an isomerization agent of the class consisting of surface-active substances, phosphorus oxychloride, sulfuric acid and organic sulfonic acids and the products obtainable from such isomerization products by catalytic hydrogenation, and an organic solvent.

16. Oil-varnishes comprising from 2 to 10 parts by weight of a drying oil, one part by weight of a thermoplastic, resinous, brittle conversion product of rubber being less unsaturated than rubber, having a softening point of between 70° and 100° C., being readily soluble in aromatic, open chain aliphatic and cycloaliphatic hydrocarbons and chlorinated hydrocarbons, and being selected from the group consisting of the isomerization products obtained by reacting rubber with an isomerization agent of the class consisting of surface-active substances, phosphorus oxychloride, sulfuric acid and organic sulfonic acids and the products obtainable from such isomerization products by catalytic hydrogenation, an organic solvent and a siccative.

17. Oil-varnishes comprising from 2 to 10 parts by weight of a drying oil, one part by weight of a thermoplastic, resinous, brittle conversion product of rubber being less unsaturated than rubber, having a softening point of between 70° and 100° C., being readily soluble in aromatic, open chain aliphatic and cycloaliphatic hydrocarbons, and being selected from the group consisting of the isomerization products obtained by reacting rubber with an isomerization agent of the class consisting of surface-active substances, phosphorus oxychloride, sulfuric acid and organic sulfonic acids and the products obtainable from such isomerization products by catalytic hydrogenation, an organic solvent, a siccative and a pigment.

18. Oil varnishes comprising from 0.5 to 20 parts by weight of a drying oil and one part by weight of a rubber conversion product obtainable by heating unvulcanized rubber in the presence of a finely divided, porous, surface active substance having a slightly acid reaction until a brittle product is obtained.

WILHELM BREUERS.
HERMANN SCHATZ.